US011638294B2

(12) United States Patent
Humbert et al.

(10) Patent No.: US 11,638,294 B2
(45) Date of Patent: Apr. 25, 2023

(54) 5G SERVICE INDICATOR PRESENTATION USING CAPABILITY COMPARISON BY USER EQUIPMENT

(71) Applicant: T-Mobile USA, Inc., Bellevue, WA (US)

(72) Inventors: John J. Humbert, Roeland Park, KS (US); Terri L. Brooks, Prosper, TX (US); Ming Shan Kwok, Seattle, WA (US); Scott Francis Migaldi, Cary, IL (US); Wafik Abdel Shahid, Kenmore, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 17/038,094

(22) Filed: Sep. 30, 2020

(65) Prior Publication Data
US 2022/0104192 A1 Mar. 31, 2022

(51) Int. Cl.
| | |
|---|---|
| *H04W 72/04* | (2023.01) |
| *H04W 64/00* | (2009.01) |
| *H04W 76/10* | (2018.01) |
| *H04W 72/51* | (2023.01) |
| *H04W 72/0453* | (2023.01) |
| *H04W 88/06* | (2009.01) |
| *H04W 84/04* | (2009.01) |

(52) U.S. Cl.
CPC ........... *H04W 72/51* (2023.01); *H04W 64/00* (2013.01); *H04W 72/0453* (2013.01); *H04W 76/10* (2018.02); *H04W 84/042* (2013.01); *H04W 88/06* (2013.01)

(58) Field of Classification Search
CPC ... H04W 72/048; H04W 76/10; H04W 64/00; H04W 72/0453; H04W 84/042; H04W 88/06; H04W 76/16; H04W 52/0245; H04L 5/0082; H04B 17/318
See application file for complete search history.

(56) References Cited

U.S. PATENT DOCUMENTS

| | | | | |
|---|---|---|---|---|
| 10,841,023 | B2* | 11/2020 | Patel | ..................... H04W 48/18 |
| 11,291,080 | B2* | 3/2022 | Dhanapal | .......... H04W 28/0268 |
| 2019/0069205 | A1* | 2/2019 | Lee | ................. H04W 36/00835 |
| 2019/0150082 | A1 | 5/2019 | Kedalagudde et al. | |
| 2020/0314932 | A1* | 10/2020 | Jin | .......................... H04W 8/22 |
| 2021/0037426 | A1 | 2/2021 | Zhu et al. | |
| 2021/0084593 | A1* | 3/2021 | Jia | ......................... H04W 48/12 |

(Continued)

OTHER PUBLICATIONS

UpperLayerIndication enhancements: retrieved on Oct. 27, 2020, at «https://www.3gpp.org/specifications/84-change-requests», 13 pages.

(Continued)

*Primary Examiner* — Khawar Iqbal
(74) *Attorney, Agent, or Firm* — Lee & Hayes, P.C.

(57) ABSTRACT

Determining when to display a Fifth Generation (5G) service indicator is described herein. In an example, a user equipment (UE) can compare capabilities supported by the UE with capabilities available to the UE (e.g., in a geographic area of the UE) to determine whether the UE can display the 5G service indicator. In some examples, such capabilities can be determined based at least in part on E-UTRAN New Radio-Dual Connectivity (EN-DC) combinations of frequency bands.

20 Claims, 9 Drawing Sheets

(56) References Cited

U.S. PATENT DOCUMENTS

| | | | | |
|---|---|---|---|---|
| 2021/0267000 A1* | 8/2021 | Jain | ................... | H04W 24/08 |
| 2021/0329445 A1* | 10/2021 | Zhang | ................... | H04W 8/22 |
| 2021/0345454 A1* | 11/2021 | Dhanapal | ........... | H04W 28/0268 |
| 2021/0368568 A1* | 11/2021 | Jangid | ................... | H04L 1/203 |
| 2022/0104193 A1* | 3/2022 | Humbert | ................ | H04W 8/20 |
| 2022/0295584 A1* | 9/2022 | Jin | ................... | H04W 8/22 |
| 2022/0295586 A1* | 9/2022 | Haberman | ............ | H04W 16/32 |
| 2022/0338188 A1* | 10/2022 | Jain | ................... | H04W 72/0453 |

OTHER PUBLICATIONS

Office Action for U.S. Appl. No. 17/038,166, dated Jun. 9, 2022, Humbert, "5G Service Indicator Presentation Using Network-Based Capability Comparison", 8 pages.

* cited by examiner

5G SERVICE INDICATOR PRESENTATION USING CAPABILITY COMPARISON BY USER EQUIPMENT

BACKGROUND

There are different generations of wireless network technology. Fifth Generation (5G) network technology offers greater reliability than existing wireless network technologies, provides enhanced capacity over existing wireless network technologies, and provides faster speeds than existing wireless network technologies. As a result, 5G network technology has the potential to benefit everything from entertainment and gaming to education and public safety. Over time, 5G network technology is expected to deliver faster download speeds, real-time responses, and enhanced connectivity, giving businesses and consumers the potential to experience new, innovative technologies.

Telecommunications service providers can cause user equipment (UE) to display service indicators to describe available radio access technology (e.g., Third Generation (3G) representing Universal Mobile Telecommunications Service (UMTS), Fourth Generation (4G) representing Long Term Evolution (LTE) and/or Evolved Universal Terrestrial Radio Access (E-UTRA), 5G representing New Radio (NR), etc.). In some examples, however, such service indicators can be inaccurate, misleading users to believe that a radio access technology, and corresponding type and/or level of service, is available when it is not available. That is, a service indicator can be displayed indicating that a type and/or level of service is available when the type and/or level of service is not actually available. Inaccuracies associated with the displaying of service indicators can lead to poor user experiences and undermine user trust in telecommunications service providers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
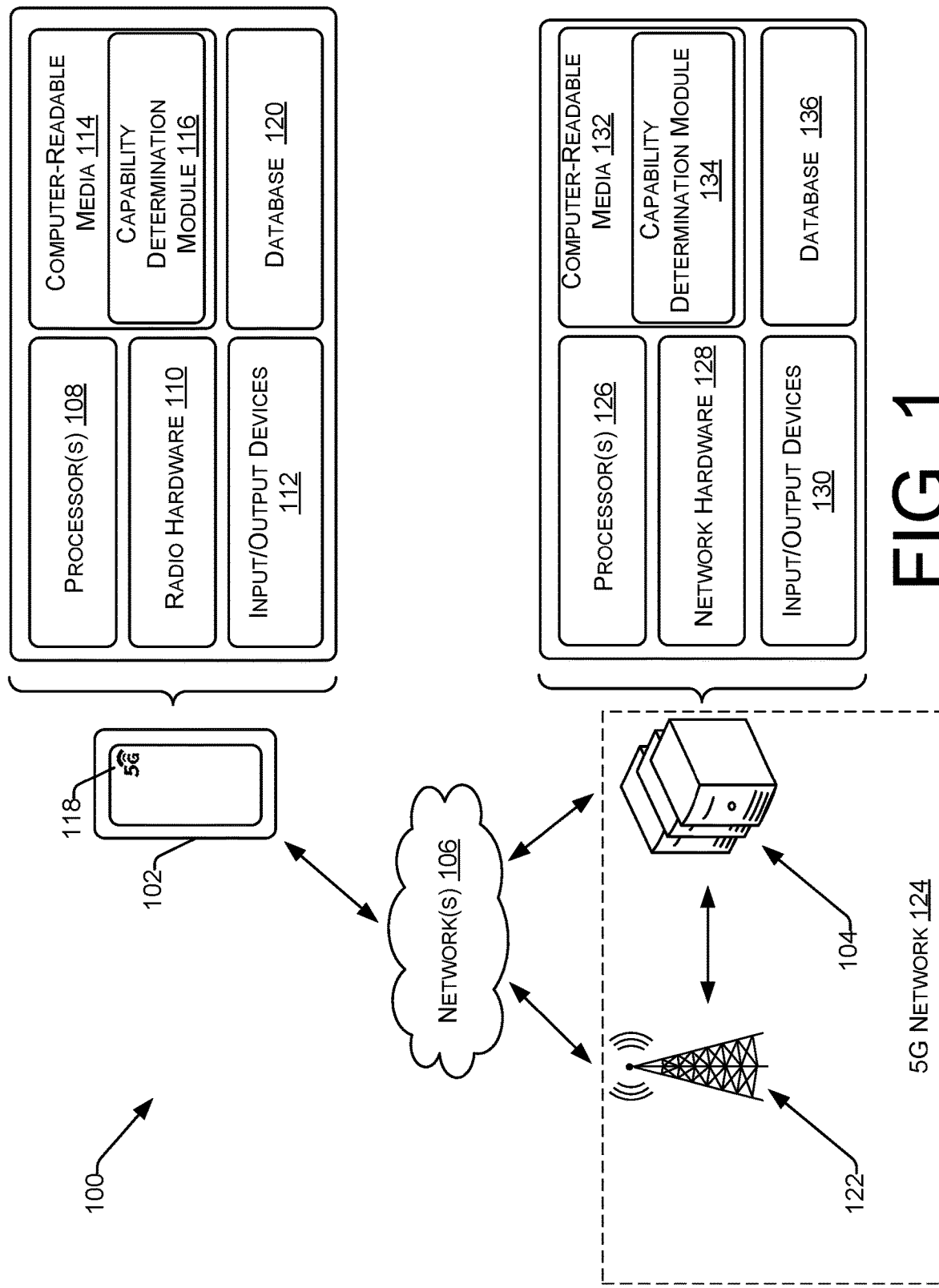
FIG. 1 illustrates an example environment associated with techniques described herein.

A user equipment (UE) can display a Fifth Generation (5G) service indicator to indicate when 5G radio access technology is available. Additional details associated with presenting 5G service indicators are described in $3^{rd}$ Generation Partnership Project (3GPP) technical specification nos. 36.306, 36.331, 38.311, and 38.306. In existing technologies, a UE can display a 5G service indicator even if the UE doesn't support certain 5G capabilities (and thus doesn't actually have access to 5G technology). Techniques described herein are directed to comparing capabilities—such as Evolved UMTS Terrestrial Radio Access Network (E-UTRAN) New Radio (NR)-Dual Connectivity (EN-DC) combinations of frequency bands—to determine whether a UE can accurately display a 5G service indicator, indicating that 5G radio access technology, and associated services, are available for use by the UE. In some examples, such a comparison can be performed by network computing devices (e.g., computing devices associated with a network, which can be associated with a service provider, such as a telecommunications service provider). In some examples, such a comparison can be performed by UE.

For instance, in at least one example, computing device(s) associated with a network can receive an indication of EN-DC combinations (e.g., of frequency bands) that are supported by the UE (e.g., during call set up procedures). The computing device(s) associated with the network can determine which EN-DC combinations are available for a certain area (e.g., geographic area, cell, etc.) within which the UE is located. The computing device(s) associated with the network can perform a comparison to determine whether the UE supports EN-DC combinations used in the certain area and, if the UE supports one or more of the EN-DC combinations, the network can enable the 5G service indicator to be displayed on the UE.

In an additional or alternative example, the computing device(s) associated with the network can provide the UE with an indication of NR frequency band(s) that can be used in a certain area (e.g., geographic area, cell, etc.), as well as Long Term Evolution (LTE) frequency band(s) that can be used in the certain area. In some examples, such an indication (e.g., NR frequency bands and/or LTE frequency bands) can be determined based at least in part on a carrier frequency transmitted by a serving cell and/or from an LTE neighbor list. The UE can use the information to infer possible EN-DC combinations (e.g., of frequency bands) used in the certain area and can determine whether the UE supports the inferred EN-DC combinations before displaying the 5G service indicator. In such an example, if the UE supports at least one of the available EN-DC combinations (e.g., of frequency bands), the UE can present a 5G service indicator. However, if the UE does not support at least one of the available EN-DC combinations (e.g., of frequency bands) and/or otherwise cannot use at least one of the available EN-DC combinations (e.g., of frequency bands), the UE can refrain from presenting a 5G service indicator.

Techniques described herein are directed to systems, methods, processes, and the like for determining when to display 5G indicators with more accuracy. As described above, telecommunications service providers can cause a UE to display service indicators indicating radio access technologies (e.g., 3G representing UMTS, 4G representing LTE and/or E-UTRA, 5G representing NR, etc.) being used, or otherwise available, for the UE. In some examples, however, such service indicators can be inaccurate, misleading users to believe that a radio access technology is available when it is not available. For example, in 5G networks, the frequency or radio access technology used can greatly vary the type and/or level of service that can be offered. In some examples, when a combination of radio access technologies are being used (e.g., EN-DC), a non-standalone (NSA) UE in idle mode may not have any knowledge of which EN_DC combinations (e.g., of frequency bands) are implemented on the 5G network for a particular area (e.g., geographic area, cell, etc.). For example, in existing techniques, UEs utilize an upper layer indication bit to set the 5G service indicator, which does not take into account EN-DC combinations supported by a UE. As such, in existing techniques, the UE can present a 5G service indicator when a UE does not support any of the EN-DC combinations (e.g., of frequency bands) used on the serving cell. Thus, such mismatches (e.g., in available capabilities and supported capabilities) can cause a 5G service indicator to be presented when 5G radio access technology is not available (e.g., when the UE doesn't support the EN_DC combinations).

As described above, 5G service indicators can be presented indicating that 5G radio access technology is available when the type and/or level of service is not actually available. Such presentation can be erroneous and misleading. Inaccuracies associated with the display of service indicators can lead to poor user experiences and undermine user trust in telecommunications service providers. Techniques described herein, however, are directed to an improvement to such a technical problem. That is, techniques described herein offer a technical solution to an existing technology or technical process—determining when to present a 5G service indicator so that users of UEs can rely on information presented via a UI, as it pertains to wireless communication technologies. As such, techniques described herein provide an increased accuracy with which 5G service indicators can be presented.

FIG. 1 illustrates an example environment 100 associated with techniques described herein. In the environment 100, a user equipment (UE) 102 can communicate with one or more computing devices of a service provider (e.g., server(s) 104, etc.) via one or more networks 106.

In at least one example, the UE 102 can be any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar computing device, as well as situated user equipment including, without limitation, a television (smart television), set-top-box (STB), desktop computer, an IoT device, and the like.

The processor(s) 108 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 108 can execute one or more modules and/or processes to cause the UE 102 to perform a variety of functionalities, as set forth above and explained in further detail in the following disclosure. Additionally, each of the processor(s) 108 can possess its own local memory, which also can store program modules, program data, and/or one or more operating systems.

The radio hardware 110 provides the UE 102 with wireless capabilities, such as connecting to one or more base stations associated with one or more service providers, as described below. The radio hardware 110 can include or be incorporated into processors, ASICs, programmable circuits such as FPGAs, or in other ways. In at least one example, the radio hardware 110 can include radios associated with one or more cellular network technologies (e.g., second generation (2G), 3G, 4G, 5G, etc.). The UE 102 can include additional or alternative hardware to enable the device to access service provider(s) via additional or alternative network(s) (e.g., BLUETOOTH®, WI-FI®, etc.). In at least one example, the radio hardware 110 can establish a connection to a network node of a network configured with NSA network architecture. Additional details are described below.

The radio hardware 110 can configure the UE 102 for transmitting and/or receiving data wirelessly using any suitable wireless communications and/or data technology, protocol, or standard, such as Global System for Mobile Communications (GSM), Time Division Multiple Access (TDMA), UMTS, Evolution-Data Optimized (EVDO), LTE, Advanced LTE (LTE+), NR, Generic Access Service provider (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over internet protocol (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future internet protocol (IP)-based service provider technology or evolution of an existing IP-based service provider technology.

The input/output devices 112 can include a keypad, a cursor control, a touch-sensitive display, voice input device, a display, speaker(s), printers, etc. These devices are well known in the art and need not be discussed at length here.

Depending on the exact configuration and type of the UE 102, the computer-readable media 114, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, service provider attached storage, storage area service providers, hosted computer storage or any other storage memory, storage device, and/or storage medium that can be used to store and maintain information for access by a user equipment.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 114 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media can be part of the UE 102.

In contrast, communication media includes computer readable instructions, data structures, program modules, or other data in a modulated data signal, such as a carrier wave, or other transmission mechanism. As defined herein, computer storage media does not include communication media.

The computer-readable media 114 can include one or more modules and data structures that can be in the form of stand-alone applications, productivity applications, an operating system component, or any other application or software module to configure the UE 102 to perform operations, as described herein. In at least one example, the computer-readable media 114 can include a capability determination module 116, which can be referred to as the client-side capability determination module 116.

In at least one example, the client-side capability determination module 116 can receive, from a computing device associated with a 5G network, available capability data indicating 5G capabilities available to the UE in a certain area with which the UE is associated (e.g., an area within which the UE is operating). In some examples, the certain area can be a geographic area, which can be associated with one or more cells (e.g., a primary cell, a secondary cell, etc.). In at least one example, the available capability data can indicate one or more NR frequency bands associated with the certain area within which the UE 102 is operating. In some examples, the client-side capability determination module 116 determine available capability data based at least in part on the one or more NR frequency bands.

The client-side capability determination module 116 can utilize additional or alternative data to determine available capability data. In some examples, the client-side capability determination module 116 can receive an indication of one or more LTE frequency bands associated with the certain area within which the UE 102 is operating. In such examples, the client-side capability determination module 116 can determine the available capability data based at least in part on the LTE frequency bands associated with the certain area. In some examples, the client-side capability determination module 116 can determine a carrier frequency transmitted by a service cell associated with the certain area and/or a LTE neighbor list associated with the certain area. In at least one example, the client-side capability determination module 116 can determine the available capability data based at least in part on the carrier frequency transmitted by the service cell and/or from the LTE neighbor list. Furthermore, in some examples, the client-side capability determination module 116 can track capability usage and can determine the available capability data based at least in part on the stored indications of capability usage, for example, using a machine-learning mechanism.

In at least one example, the available capability data can indicate one or more EN-DC combinations of frequency bands available to the UE 102 in the certain area. In some examples, the client-side capability determination module 116 can determine, based at least in part on the indication of the one or more NR frequency bands associated with the certain area, one or more available EN-DC combinations of frequency bands available to the UE 102 in the certain area. The client-side capability determination module 116 can utilize additional or alternative data to determine which EN-DC combination(s) of frequency bands are available to the UE 102.

For example, the client-side capability determination module 116 can receive an indication of one or more LTE frequency bands associated with the certain area within which the UE 102 is operating, and the client-side capability determination module 116 can determine the one or more EN-DC combinations of frequency bands available to the UE 102 based at least in part on the LTE frequency bands associated with the certain area. In some examples, the client-side capability determination module 116 can determine a carrier frequency transmitted by a service cell associated with the certain area and/or a LTE neighbor list associated with the certain area. That is, in at least one example neighbor information can be shared through a broadcast message (e.g., LTE SIB). From the broadcast message, the UE 102 can determine what neighbor frequencies are associated with the current service cell. In at least one example, the client-side capability determination module 116 can infer the one or more EN-DC combinations of frequency bands available to the UE 102 based at least in part on the carrier frequency and/or the LTE neighbor list (e.g., based at least in part on LTE frequency bands used in the certain area, which can be determined based at least in part on the carrier frequency transmitted by the service cell and/or from the LTE neighbor list). As such, the UE 102 can infer which EN-DC combination(s) of frequency bands are served by the anchor cell. In at least one example, the client-side capability determination module 116 can determine the one or more EN-DC combinations of frequency bands available to the UE 102 based at least in part on the inferred EN-DC combination(s) of frequency bands. Furthermore, in some examples, the client-side capability determination module 116 can track EN-DC combination(s) of frequency bands that are used in the certain area and store indications of such EN-DC combination(s) of frequency bands (e.g., in a database). In at least one example, the client-side capability determination module 116 can determine the one or more EN-DC combinations of frequency bands available to the UE 102 based at least in part on the indications of used EN-DC combination(s) of frequency bands, for example, using a machine-learning mechanism.

In at least one example, the client-side capability determination module 116 can determine supported capability data indicating 5G capabilities supported by the UE 102. In at least one example, supported capability data can be stored in the database 120. In at least one example, the client-side capability determination module 116 can access stored device data and/or stored capability data, which can be stored in a database 120 associated with the UE 102, to determine the 5G capabilities supported by the UE 102. In at least one example, a determination of supported capability data can be based at least in part on determining that the UE 102 is associated with a subscription enabling the UE 102 to access certain capabilities. In at least one example, the supported capability data can include EN-DC combination (s) of frequency bands that are supported by the UE 102. In at least one example, the UE 102 can "support" an EN-DC combination of frequency bands based at least in part on a determination that the UE 102 is capable of accessing the EN-DC combination of frequency bands available to the UE 102.

In at least one example, the client-side capability determination module 116 can determine whether there is a correspondence between the supported capability data and the available capability data. In at least one example, the client-side capability determination module 116 can compare the available capability data with the supported capability data to determine whether there is a correspondence between the available capability data and the supported capability data. In at least one example, such a correspondence can be a match between capabilities supported by the UE 102 and available to the UE 102. In some examples, such a correspondence can be a similarity metric that satisfies a threshold, or the like.

In at least one example, the client-side capability determination module 116 can compare the available capability data with the supported capability data to determine whether the UE is capable of supporting at least one available EN-DC combination of frequency bands. In at least one example, the client-side capability determination module 116 can compare the one or more available EN-DC combinations of frequency bands with the one or more supported EN-DC combinations of frequency bands to determine if there is a match, or other correspondence, between at least one of the one or more available EN-DC combinations of frequency bands and at least one of the one or more supported EN-DC combinations of frequency bands. In at least one example, if there is a match, or other correspondence, between at least one of the one or more available EN-DC combinations of frequency bands and at least one of the one or more supported EN-DC combinations of frequency bands, the client-side capability determination module 116 can cause a 5G service indicator to be presented via a display of the UE 102. The 5G service indicator can indicate that 5G radio access technology—availed via a 5G network—is available to the UE 102.

In some examples, matching, or otherwise corresponding, EN-DC combinations can be associated with confidence scores that can indicate a level of confidence (e.g., based at least in part on information associated with the 5G network) associated with the availability of such EN-DC combinations. In such examples, information associated with the 5G network can be provided to the client-side capability determination module 116 (e.g., by the server(s) 104) and can indicate whether the eNodeB or gNodeB base stations associated with a particular EN-DC combination are co-located (e.g., providing more confidence—and thus, a higher confidence score—that the 5G network is accessible to the UE 102 via that particular EN-DC combination) or not co-located (e.g., providing less confidence—and thus, a lower confidence score—that the 5G network is accessible to the UE 102 via that particular EN-DC combination). The client-side capability determination module 116 can determine confidence scores associated with matching, or otherwise corresponding, EN-DC combinations. In at least one example, the client-side capability determination module 116 can compare a confidence score associated with an EN-DC combination that is both available and supported meets or exceeds a threshold. If the confidence score is below the threshold, the client-side capability determination module 116 can determine that that EN-DC combination is not available even though the available capability data and supported capability data indicate that it is.

In some examples, the 5G service indicator can be a text element, graphical element, icon, symbol, combination of the foregoing, or the like. A non-limiting example of a 5G service indicator 118 that can be presented via a display of the UE is illustrated in FIG. 1. Additional examples are described below with reference to FIGS. 2A-2C. While the 5G service indicator 118 can indicate that 5G radio access technology is available (and that the UE 102 is technically capable of accessing 5G radio access technology), the presentation of such a 5G service indicator 118 may not guarantee that the UE 102 is able to utilize services via the 5G network (e.g., due to 5G network constraints or subscription-level limitations of the UE 102). Further, some services availed via the 5G network can be availed to the UE 102 based at least in part on network conditions and/or other negotiations between the UE 102 and the 5G network.

In at least one example, a 5G service indicator can be presented so long as one or more conditions are satisfied. In at least one example, such conditions can include (i) the UE 102 is camped on a base station capable of NSA (e.g., the base station 122), (ii) the UE 102 has been provided (e.g., from the server(s) 104) an indication of the one or more NR frequency bands that are deployed in a certain area associated with the UE 102 (e.g., available capability data), and (iii) the UE 102 is capable of supporting at least one of the NR frequency bands that is deployed in the certain area and can use NR (e.g., at least one available NR frequency band matches or otherwise corresponds to at least one supported NR frequency band). If the UE 102 does not support any of the NR frequency band(s) deployed in the certain area and/or cannot use NR for any other reason, the client-side capability determination module 116 can refrain from causing the 5G service indicator to be presented via the display of the UE 102.

In at least one example, the client-side capability determination module 116 can receive an instruction to present a 5G service indicator from the server(s) 104. In such an example, the client-side capability determination module 116 can send supported capability data to the server(s) 104. Such supported capability data can include an indication of one or more EN-DC combinations of frequency bands that are supported by the UE 102. In some examples, such capability data can be provided during a communication set-up. In at least one example, context data can be provided with the capability data. Such context data can include, but is not limited to, geolocation data (e.g., a location of the UE), application data (e.g., indicating which application(s) are executing on the UE 102 and/or for which the 5G services may be used), and/or the like. In at least one example, based at least in part on providing the capability data (and, in some examples, context data) to the server(s) 104, the server(s) 104 can send an instruction to the client-side capability determination module 116 to cause the client-side capability determination module 116 to present the 5G service indicator (e.g., if the capabilities comparison performed by the server(s) 104 identifies a match or other correspondence between available capability data and supported capability data). Additional details are described below.

In at least one example, the 5G service indicator can be presented so long as the UE 102 is associated with a state indicating that the UE 102 is in an active mode and the UE 102 continues to use one or more NR frequency bands. In at least one example, "active mode" indicates that the UE 102 is measuring neighbor information constantly (e.g., at a frequency above a threshold) for information. If the state of the UE 102 is no longer associated with an active mode (e.g., the UE 102 is not measuring neighbor information constantly or at a frequency above a threshold) and/or the UE 102 ceases to use one or more NR frequency bands, the client-side capability determination module 116 can terminate the presentation of the 5G service indicator. In an additional or alternative example, the 5G service indicator can be presented for a period of time, so long as the UE 102 is associated with a state indicating that the UE 102 is in an active mode. In such an example, if the period of time lapses and/or the state of the UE 102 is no longer associated with an active mode, the client-side capability determination module 116 can terminate the presentation of the 5G service indicator. The period of time can be configurable and can be predetermined.

In at least one example, if at a time after the UE 102 has been determined to support at least one of the one or more available EN-DC combinations of frequency bands, the client-side capability determination module 116 determines that the UE 102 does not support, or otherwise cannot access, the at least one EN-DC combination of frequency bands, the client-side capability determination module 116 can terminate presentation of the 5G service indicator.

In at least one example, the UE 102 can be associated with a database 120, which can be integrated with the UE 102 (as shown in FIG. 1) and/or the computer-readable media 114, or can be remotely located from the UE 102 and accessible to the UE 102. The database 120, which can be any type of datastore, can store user data associated with the user, device data associated with the UE, subscription data associated with an account of the user, supported capability data (e.g., EN-DC combinations of frequency bands, etc.), and/or the like.

In at least one example, the UE 102 can subscribe to, or otherwise access, services associated with a service provider providing wireless communication or other telecommunication services (e.g., a wireless communication service provider, a telecommunications service provider, or the like). In at least one example, the server(s) 104 can be associated with the service provider. In at least one example, the service provider can be associated with one or more cellular networks associated with one or more radio access technologies (e.g., 2G, 3G, 4G, 5G, etc.) or other network technologies. In at least one example, a cellular network can include one or more base stations (also known as cell sites or cell towers), which can be associated with antennae and other electronic communications equipment (e.g., transceivers, digital signal processors, control electronics, a GPS receiver, etc.) to create a cell. An example base station 122 is illustrated in FIG. 1. However, in practice, the environment 100 can include multiple base stations (e.g., tens, hundreds, thousands, etc.). The service provider can have multiple base stations, creating multiple cells, thereby generating a cellular network. In some examples, each cell can be associated with a physical cell ID (PCI) to identify the cell in the cellular network. That is, a cell associated with the base station 122 can be associated with a PCI to identify the cell in the cellular network.

In at least one example, operations described as being performed by a "network" can be performed by one or more computing devices associated with the service provider, which can include base stations (e.g., the base station 122), the server(s) 104, and/or the like. That is, in at least one example, operations performed by the base station 122 and/or the server(s) 104 can be attributed to a network, such as the 5G network 124. In at least one example, the 5G network 124 can be one of the network(s) 106, and can comprise computing devices that are configured with 5G radio access technology. In some examples, the 5G network can be associated with a NSA mode (e.g., a mode of 5G NR deployment that can depend on the control plane of an existing 4G LTE network for control functions, while 5G NR can be exclusively focused on the user plane). In some examples, the 5G network can be associated with a Stand-alone (SA) mode (e.g., using 5G cells for both signaling and information transfer to allow the deployment of 5G without the LTE network). In some examples, the network(s) 106 can include additional or alternative networks, such as other cellular networks, wireless communication networks, the Internet, BLUETOOTH®, WI-FI®, etc. Additional or alternative communication networks are well known in the art and thus are not further described herein.

In at least one example, the server(s) 104 can be any type of server, such as a network-accessible server. In some examples, the server(s) 104 can be stand-alone computing systems, distributed-computing systems, networked-computing systems, etc. For instance, in at least one example, one or more of the functionalities described herein as being performed by the server(s) 104 can be performed by a single device or multiple devices. In some examples, one or more of the functionalities described herein can be performed by the UE 102 and/or the base station 122 instead of, or in addition to, the server(s) 104. Similarly, in some examples, one or more of the functionalities described herein as being performed by the UE 102 can be performed by the server(s) 104 and/or the base station 122 instead of, or in addition to, the UE 102.

In various examples, each of the server(s) 104 can be associated with one or more processors 126, network hardware 128, input/output devices 130, and computer-readable media 132. The processor(s) 126 can have the same and/or similar structure and/or function as the processor(s) 108, described above.

The network hardware 128 can provide wired or wireless networking capabilities to the server(s) 104. The network hardware 128 can include or be incorporated into processors, ASICs, programmable circuits such as FPGAs, or in other ways.

The input/output devices 130 can include a keypad, a cursor control, a touch-sensitive display, voice input device, a display, speaker(s), printers, etc. These devices are well known in the art and need not be discussed at length here.

The computer-readable media 132 can have the same or similar structure and/or function as the computer-readable media 114 described above. In at least one example, the computer-readable media 132 can include one or more modules and data structures that can be in the form of stand-alone applications, productivity applications, an operating system component, or any other application or software module to configure the server(s) 104 to perform operations, as described herein. In at least one example, the computer-readable media 132 can include a capability determination module 134. In an additional or alternative example, the capability determination module 134 can be associated with the base station 122 and/or the server(s) 104.

The capability determination module 134, which can be called the server-side capability determination module 134, the server-side capability determination module 134 can determine available capability data indicating EN-DC capabilities available to the UE 102 in a certain area within which the UE 102 is operating. In some examples, the server-side capability determination module 134 can receive an indication of a location of the UE 102 and can access stored capability data in a database to determine the available capability data. That is, the server-side capability determination module 134 can perform a look-up to determine capabilities available to the UE 102 based at least in part on receiving an indication of a location of the UE 102. In some examples, the server-side capability determination module 134 can receive or otherwise access subscription data associated with the UE 102 and can determine the available capability data based at least in part on the subscription data. In some examples, the server-side capability determination module 134 can determine activation data associated with a secondary cell associated with a certain area within which the UE 102 is located and the server-side capability determination module 134 can determine the available capability data based at least in part on the subscription data. In some examples, the server-side capability determination module 134 can utilize data indicating which frequency bands are in use, available bandwidth, which frequency bands have been deployed, and/or the like to determine available capability data.

In at least one example, the available capability data can indicate one or more EN-DC combinations of frequency bands that are available to the UE 102 in the certain area. In some examples, the server-side capability determination module 134 can receive an indication of a location of the UE 102 and can access stored capability data in a database to determine the available capability data. That is, the server-side capability determination module 134 can perform a look-up to determine the one or more EN-DC combinations of frequency bands that are available to the UE 102 based at least in part on receiving an indication of a location of the UE 102. In some examples, the server-side capability determination module 134 can receive or otherwise access subscription data associated with the UE 102 and can determine the one or more EN-DC combinations of frequency bands that are available to the UE 102 based at least in part on the subscription data. In some examples, the server-side capability determination module 134 can determine activation data associated with a secondary cell associated with a certain area within which the UE 102 is located and the server-side capability determination module 134 can determine the one or more EN-DC combinations of frequency bands that are available to the UE 102 based at least in part on the subscription data. In some examples, the server-side capability determination module 134 can utilize data indicating which frequency bands are in use, available bandwidth, which frequency bands have been deployed, and/or the like to determine which EN-DC combinations of frequency bands are available to the UE 102.

In some examples, the server-side capability determination module 134 can send the available capability data to the UE 102 for the client-side capability comparison described above. In some examples, the server-side capability determination module 134 can utilize the available capability data for a server-side capability comparison as described below.

In at least one example, the server-side capability determination module 134, can receive supported capability data from the UE 102. In at least one example, the supported capability data can indicate EN-DC capabilities supported by the UE 102. In some examples, the supported capability data can be provided in association with setup of a communication (e.g., during a call setup procedure). In at least one example, the supported capability data can indicate one or more EN-DC combinations of frequency bands that are supported by the UE 102. In some examples, the server-side capability determination module 134 can request the UE 102 to provide EN-DC combination(s) of frequency band that are available to it and/or measurements.

In at least one example, the server-side capability determination module 134 can determine whether there is a correspondence between the supported capability data and the available capability data. In at least one example, the server-side capability determination module 134 can compare the supported capability data with the available capability data to determine if there is a correspondence. In at least one example, such a correspondence can be a match between capabilities supported by the UE 102 and available to the UE 102. In some examples, such a correspondence can be a similarity metric that satisfies a threshold, or the like.

In some examples, the server-side capability determination module 134 can determine whether the UE 102 is capable of supporting at least one available EN-DC combination of frequency bands. In at least one example, the server-side capability determination module 134 can compare the supported capability data with the available capability data to determine if there is a correspondence. In at least one example, such a comparison can compare available EN-DC combination(s) of frequency bands with supported EN-DC combination(s) of frequency bands to determine whether at least one of the available EN-DC combination(s) of frequency bands matches, or otherwise corresponds, with at least one of the supported EN-DC combination(s) of frequency bands. In at least one example, if at least one of the available EN-DC combination(s) of frequency bands matches, or otherwise corresponds, with at least one of the supported EN-DC combination(s) of frequency bands, the server-side capability determination module 134 can send an instruction to the UE 102 to cause the UE 102 to present the 5G service indicator.

In some examples, matching, or otherwise corresponding, EN-DC combinations can be associated with confidence scores that can indicate a level of confidence (e.g., based at least in part on information associated with the 5G network) associated with the availability of such EN-DC combinations. In such examples, information associated with the 5G network can be determined by the server-side capability determination module 134 (e.g., based at least in part on network architecture) and can indicate whether the eNodeB or gNodeB base stations associated with a particular EN-DC combination are co-located (e.g., providing more confidence—and thus, a higher confidence score—that the 5G network 124 is accessible to the UE 102 via that particular EN-DC combination) or not co-located (e.g., providing less confidence—and thus, a lower confidence score—that the 5G network 124 is accessible to the UE 102 via that particular EN-DC combination). The server-side capability determination module 134 can determine confidence scores associated with matching, or otherwise corresponding, EN-DC combinations. In at least one example, the server-side capability determination module 134 can compare a confidence score associated with an EN-DC combination that is both available and supported meets or exceeds a threshold. If the confidence score is below the threshold, the server-side capability determination module 134 can determine that that EN-DC combination is not available even though the available capability data and supported capability data indicate that it is.

In some examples, the client-side capability determination module 116 and/or the server-side capability determination module 134 can compare available and supported capability data and determine whether to cause a 5G service indicator, and in some examples, which 5G service indicator, to be presented based at least in part on context data, which can indicate a geographic area within which the UE 102 is associated, an application and/or application(s) executing on the UE 102 (e.g., e.g., indicating which application(s) are executing on the UE 102 and/or for which the 5G services may be used), etc. In at least one example, the client-side capability determination module 116 and/or the server-side capability determination module 134 can determine service characteristic(s) associated with the at least one EN-DC combination of frequency bands that is available to the UE 102. For example, such a service characteristic can be throughput, Quality of Service (QoS), or the like. In at least one example, certain service characteristics can be required to satisfy a threshold before a 5G service indicator can be presented. In such an example, the client-side capability determination module 116 and/or the server-side capability determination module 134 can compare a service characteristic associated with the at least one EN-DC combination of frequency bands that is available to the UE 102 to determine whether the service characteristic satisfies (e.g., meets or exceeds) a relevant threshold. In at least one example, if the service characteristic satisfies the threshold, the client-side capability determination module 116 and/or the server-side capability determination module 134 can cause the UE 102 to present the 5G service indicator. In at least one example, if the service characteristic does not satisfy the threshold, the client-side capability determination module 116 and/or the server-side capability determination module 134 may refrain from causing the UE 102 to present the 5G service indicator. In some examples, the threshold can be determined based at least in part on the context data. For instance, if the UE 102 is executing a virtual reality or augmented reality application, requiring a QoS above a threshold, said threshold can be used to determine whether the 5G service indicator is to be presented in that context.

In some examples, more than one of the available EN-DC combination(s) of frequency bands can match, or otherwise correspond with, more than one of the supported EN-DC combination(s) of frequency bands. In at least one example, the client-side capability determination module 116 and/or the server-side capability determination module 134 can determine which of the corresponding EN-DC combination (s) of frequency bands provides a highest type and/or level of service (e.g., best quality, etc.) and can select a 5G service indicator based on the type and/or level of service. That is, in at least one example, different EN-DC combinations of frequency bands can be associated with different 5G service indicators. In such an example, based at least in part on a particular EN-DC combination of frequency bands matching, or otherwise corresponding, in available capability data and supported capability data, the 5G service indicator corresponding to the EN-DC combination of frequency bands can be presented. In an additional or alternative example, service characteristics associated with different types and/or levels of services provided by different EN-DC combinations of frequency bands can be associated with different 5G service indicators. When a particular service characteristic associated with a type and/or level of service is determined to be available based on the capabilities comparison described above, a 5G service indicator corresponding to said service characteristic and/or type and/or level of service can be caused to be presented.

In at least one example, the server(s) 104 can be associated with a database 136, which can be integrated with the server(s) 104 (as shown in FIG. 1) and/or the computer-readable media 132, or can be remotely located from the server(s) 104 and accessible to the server(s) 104. The database 136, which can be any type of datastore, can store data including but not limited to device data of UEs associated with the 5G network 124, available capability data, user data associated with user(s) of the 5G network 124, subscription data associated with such UEs and/or users, and/or the like.

In at least one example, a "core network" can be a core part of a service provider's network, which offers numerous services to users (e.g., subscribers, customers, etc.) who are interconnected by the access network and their respective devices. In at least one example, the core network can direct telephone calls, messages, and data transmission to and/or between UEs associated with the network. In some examples, the core network can provide additional or alternative services, which can include IP multimedia subsystem (IMS) services (e.g., voice over IP (VoIP), push-to-talk (PTT), push-to-view, video calling, video sharing, etc.). In at least one example, the server(s) 104 can include application (s), an operating system component, or any other application or software module to configure the server(s) 104 to provide services availed by the core network as described herein.

Figure 2:
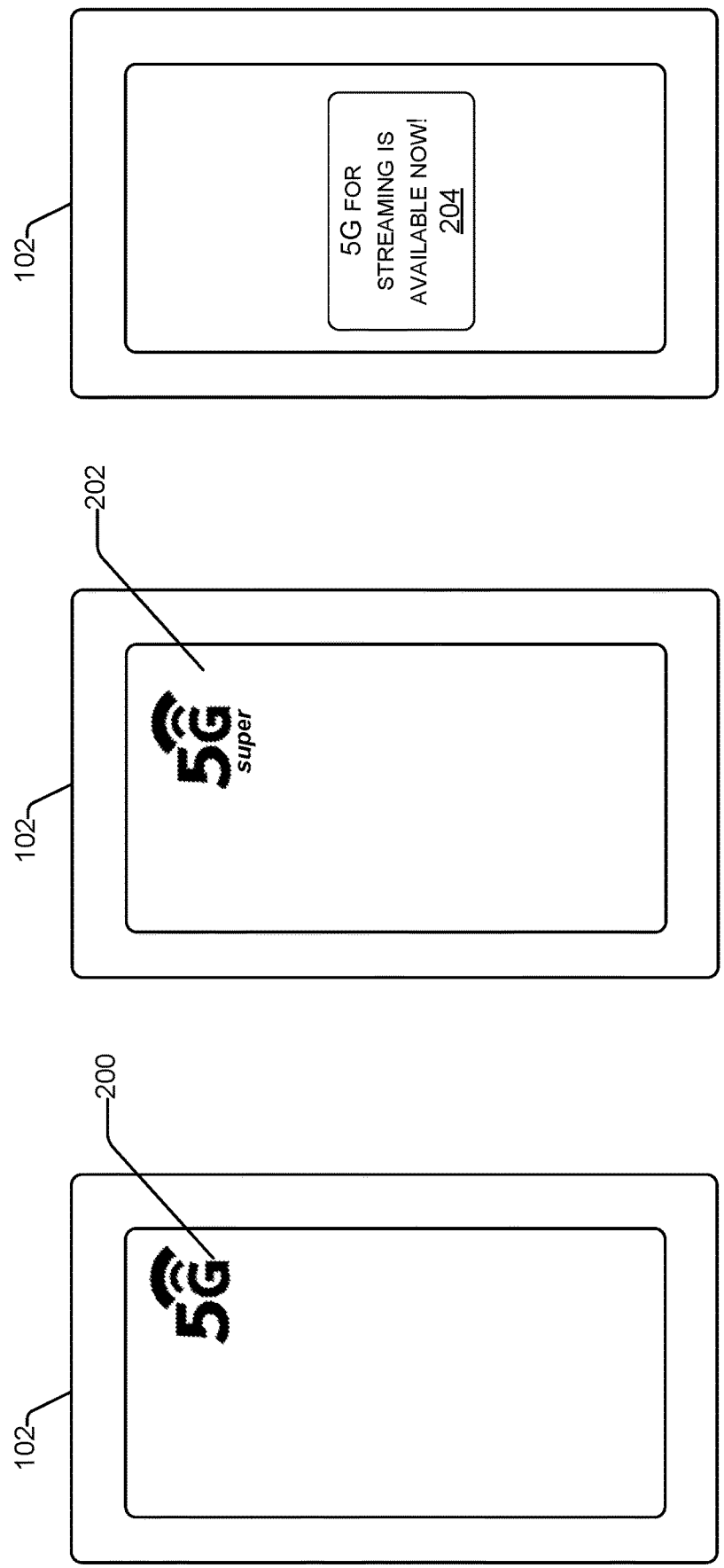
FIG. 2A illustrates an example graphical user interface for presenting a service indicator via a display of a user equipment (UE), as described herein.
FIG. 2B illustrates another example graphical user interface for presenting a service indicator via a display of a UE, as described herein.
FIG. 2C illustrates yet another example graphical user interface for presenting a service indicator via a display of a UE, as described herein.

FIGS. 2A-2C illustrate examples of 5G service indicators that can be presented via a display of the UE 102. As described above, a 5G service indicator can be a text element, graphical element, icon, symbol, combination of the foregoing, or the like. In some examples, the client-side capability determination module 116 can cause a 5G service indicator to be presented based on its own determination of 5G capabilities of the UE 102. In other examples, the client-side capability determination module 116 can receive an instruction from the server(s) 104 and can cause a 5G service indicator to be presented based at least in part on the instruction. The client-side capability determination module 116 can render the 5G service indicator such that the 5G service indicator is visible via a display of the UE 102. In some examples, the 5G service indication can be output via a different output mechanism (e.g., speakers, etc.).

FIG. 2A illustrates an example graphical user interface for presenting a 5G service indicator 200 via a display of the UE 102. In at least one example, based at least in part on a determination that at least one available EN-DC combination of frequency bands is determined to match, or otherwise correspond with, at least one supported EN-DC combination of frequency bands, a 5G service indicator, such as the 5G service indicator 200, can be presented via a display of the UE 102. In some examples, the 5G service indicator 200 may not be presented if a service characteristic (e.g., throughput, quality of service, etc.) does not satisfy a threshold.

FIG. 2B illustrates another example graphical user interface for presenting a 5G service indicator 202 via a display of the UE 102. In at least one example, different EN-DC combinations of frequency bands can be associated with different 5G service indicators. In such an example, based at least in part on a particular EN-DC combination of frequency bands matching, or otherwise corresponding, in available capability data and supported capability data, the 5G service indicator corresponding to the EN-DC combination of frequency bands can be presented. In an additional or alternative example, service characteristics associated with different types and/or levels of services provided by different EN-DC combinations of frequency bands can be associated with different 5G service indicators. In at least one example, different types and/or levels of service can be indicated with different 5G service indicators.

The 5G service indicator 202 includes a the word "super" under the 5G icon, which can indicate a higher quality of service and/or throughput than the 5G service indicator 200 in FIG. 2A. In such an example, the client-side capability determination module 116 and/or the server-side capability determination module 134 can determine which of the EN-DC combinations of frequency bands available to, and supported by, the UE 102 is associated with a highest type and/or level of service (e.g., based at least in part on throughput, QoS, etc.), and can present a 5G service indicator associated with such a type and/or level of service.

FIG. 2C illustrates yet another example graphical user interface for presenting a 5G service indicator 204 via a display of the UE 102. In some examples, the 5G service indicator can indicate that 5G is available for a particular service, service characteristic, or the like. In some examples, such a service, service characteristic, or the like can be determined based at least in part on context data, as described above. In some examples, the capabilities comparison described above can identify different types and/or levels of service available and supported by the UE 102 and the client-side capability determination module 116 and/or server-side capability determination module 134 can determine a user experience that can be supported by such type(s) and/or level(s) of service. The 5G service indicator 204 can include an indication of a user experience available to the UE 102 based on the types and/or levels of service available to and supported by the UE 102.

FIGS. 3-9 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIGS. 3-9 are described with reference to components of the example environment described above with reference to FIG. 1. However, FIGS. 3-9 are not limited to such an environment and the components described above with reference to FIG. 1 are not limited to performing the operations described below with reference to FIGS. 3-9.

Figure 3:
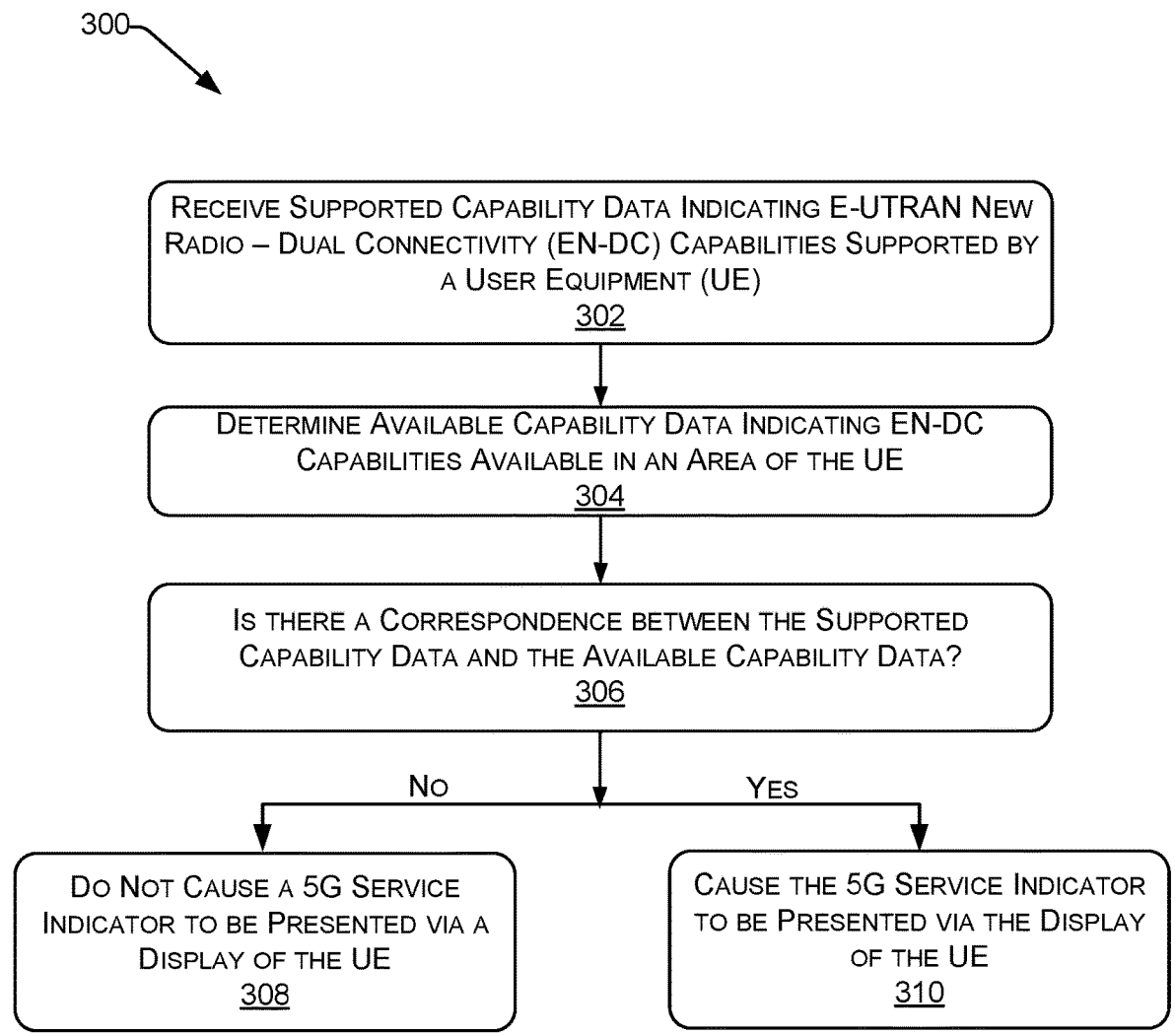
FIG. 3 illustrates an example process for determining, by a network, whether to cause a 5G service indicator to be presented via a UE, as described herein.

FIG. 3 illustrates an example process 300 for determining, by a network (e.g., the 5G network 124), whether to cause a 5G service indicator to be presented via a UE 102, as described herein.

At operation 302, the server-side capability determination module 134 can receive supported capability data indicating EN-DC capabilities supported by a UE 102. In at least one example, the server-side capability determination module 134, can receive supported capability data from the UE 102. In at least one example, the supported capability data can indicate EN-DC capabilities supported by the UE 102. In some examples, the supported capability data can be provided in association with setup of a communication (e.g., during a call setup procedure).

At operation 304, the server-side capability determination module 134 can determine available capability data indicating EN-DC capabilities available in an area of the UE 102. In at least one example, the server-side capability determination module 134 can determine available capability data indicating EN-DC capabilities available to the UE 102 in a certain area within which the UE 102 is operating. In some examples, the server-side capability determination module 134 can receive an indication of a location of the UE 102 and can access stored capability data in a database to determine the available capability data. That is, the server-side capability determination module 134 can perform a look-up to determine capabilities available to the UE 102 based at least in part on receiving an indication of a location of the UE 102. In some examples, the server-side capability determination module 134 can receive or otherwise access subscription data associated with the UE 102 and can determine the available capability data based at least in part on the subscription data. In some examples, the server-side capability determination module 134 can determine activation data associated with a secondary cell associated with a certain area within which the UE 102 is located and the server-side capability determination module 134 can determine the available capability data based at least in part on the subscription data. In some examples, the server-side capability determination module 134 can utilize data indicating which frequency bands are in use, available bandwidth, which frequency bands have been deployed, and/or the like to determine available capability data.

At operation 306, the server-side capability determination module 134 can determine whether there is a correspondence between the supported capability data and the available capability data. In at least one example, the server-side capability determination module 134 can compare the supported capability data with the available capability data to determine if there is a correspondence. In at least one example, such a correspondence can be a match between capabilities supported by the UE 102 and available to the UE 102. In some examples, such a correspondence can be a similarity metric that satisfies a threshold, or the like.

At operation 308, based at least in part on determining that there is not a correspondence between the supported capability data and the available capability data (i.e., "no" at operation 306), the server-side capability determination module 134 can refrain from causing the 5G service indicator to be presented via a display of the UE 102. That is, server-side capability determination module 134 can refrain from sending an instruction to the UE 102 to cause the UE 102 to present a 5G service indicator via a display of the UE 102.

At operation 310, based at least in part on determining that there is a correspondence between the supported capability data and the available capability data (i.e., "yes" at operation 306), the server-side capability determination module 134 can cause the 5G service indicator to be presented via the display of the UE 102. That is, if there is a correspondence between the supported capability data and the available capability data, the server-side capability determination module 134 can send an instruction to the UE 102 to cause the UE 102 to present a 5G service indicator via a display of the UE 102. In some examples, the instruction can identify a particular 5G service indicator, a period of time for presenting the 5G service indicator, etc. The UE 102 can receive the instruction and cause the 5G service indicator to be presented via the display of the UE 102. Non-limiting examples of 5G service indicators are described above with reference to FIGS. 2A-2C.

Figure 4:
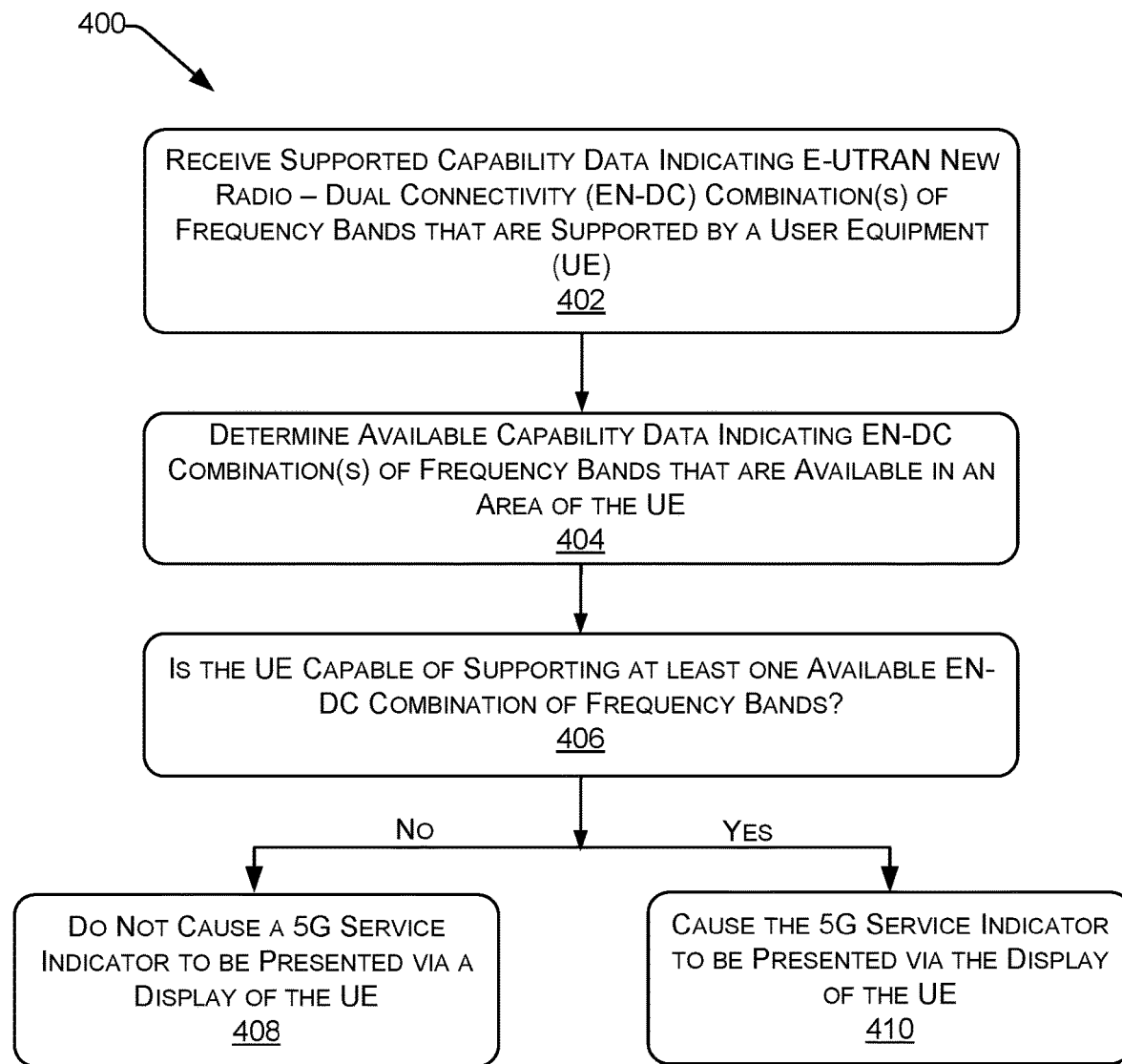
FIG. 4 illustrates an example process for determining, by a network, and based at least in part on Evolved UMTS Terrestrial Radio Access Network (E-UTRAN) New Radio-Dual Connectivity (EN-DC) combination(s) of frequency bands, whether to cause a 5G service indicator to be presented via a UE, as described herein.

FIG. 4 illustrates an example process for determining, by a network (e.g., the 5G network 124), and based at least in part on E-UTRAN New Radio-Dual Connectivity (EN-DC) combination(s) of frequency bands, whether to cause a 5G service indicator to be presented via a UE 102, as described herein.

At operation 402, the server-side capability determination module 134 can receive supported capability data indicating EN-DC combination(s) of frequency bands that are supported by a UE 102. As described above, in at least one example, the server-side capability determination module 134, can receive supported capability data from the UE 102. In at least one example, the supported capability data can indicate EN-DC capabilities supported by the UE 102. In some examples, the supported capability data can be provided in association with setup of a communication (e.g., during a call setup procedure). In at least one example, the supported capability data can indicate one or more EN-DC combinations of frequency bands that are supported by the UE 102. In some examples, the server-side capability determination module 134 can request the UE 102 to provide EN-DC combination(s) of frequency band that are available to it and/or measurements.

At operation 404, the server-side capability determination module 134 can determine available capability data indicating EN-DC combination(s) of frequency bands that are available in an area of the UE 102. As described above, in at least one example, the server-side capability determination module 134 can determine available capability data indicating EN-DC capabilities available to the UE 102 in a certain area within which the UE 102 is operating. In at least one example, the available capability data can indicate one or more EN-DC combinations of frequency bands that are available to the UE 102 in the certain area. In some examples, the server-side capability determination module 134 can receive an indication of a location of the UE 102 and can access stored capability data in a database to determine the available capability data. That is, the server-side capability determination module 134 can perform a look-up to determine the one or more EN-DC combinations of frequency bands that are available to the UE 102 based at least in part on receiving an indication of a location of the UE 102. In some examples, the server-side capability determination module 134 can receive or otherwise access subscription data associated with the UE 102 and can determine the one or more EN-DC combinations of frequency bands that are available to the UE 102 based at least in part on the subscription data. In some examples, the server-side capability determination module 134 can determine activation data associated with a secondary cell associated with a certain area within which the UE 102 is located and the server-side capability determination module 134 can determine the one or more EN-DC combinations of frequency bands that are available to the UE 102 based at least in part on the subscription data. In some examples, the server-side capability determination module 134 can utilize data indicating which frequency bands are in use, available bandwidth, which frequency bands have been deployed, and/or the like to determine which EN-DC combinations of frequency bands are available to the UE 102.

At operation 406, the server-side capability determination module 134 can determine whether the UE 102 is capable of supporting at least one available EN-DC combination of frequency bands. In at least one example, the server-side capability determination module 134 can compare the supported capability data with the available capability data to determine if there is a correspondence. In at least one example, such a comparison can compare available EN-DC combination(s) of frequency bands with supported EN-DC combination(s) of frequency bands to determine whether at least one of the available EN-DC combination(s) of frequency bands matches, or otherwise corresponds, with at least one of the supported EN-DC combination(s) of frequency bands.

At operation 408, based at least in part on determining that the UE 102 is not capable of supporting at least one available EN-DC combination of frequency bands (i.e., "no" at operation 406), the server-side capability determination module 134 can refrain from causing the 5G service indicator to be presented via a display of the UE 102, as described above with reference to operation 308 of FIG. 3.

At operation 410, based at least in part on determining that the UE 102 is capable of supporting at least one available EN-DC combination of frequency bands (i.e., "yes" at operation 306), the server-side capability determination module 134 can cause the 5G service indicator to be presented via the display of the UE 102, as described above with reference to operation 310 of FIG. 3. That is, if at least one of the available EN-DC combination(s) of frequency bands matches, or otherwise corresponds, with at least one of the supported EN-DC combination(s) of frequency bands, the server-side capability determination module 134 can send an instruction to the UE 102 to cause the UE 102 to present the 5G service indicator.

Figure 5:
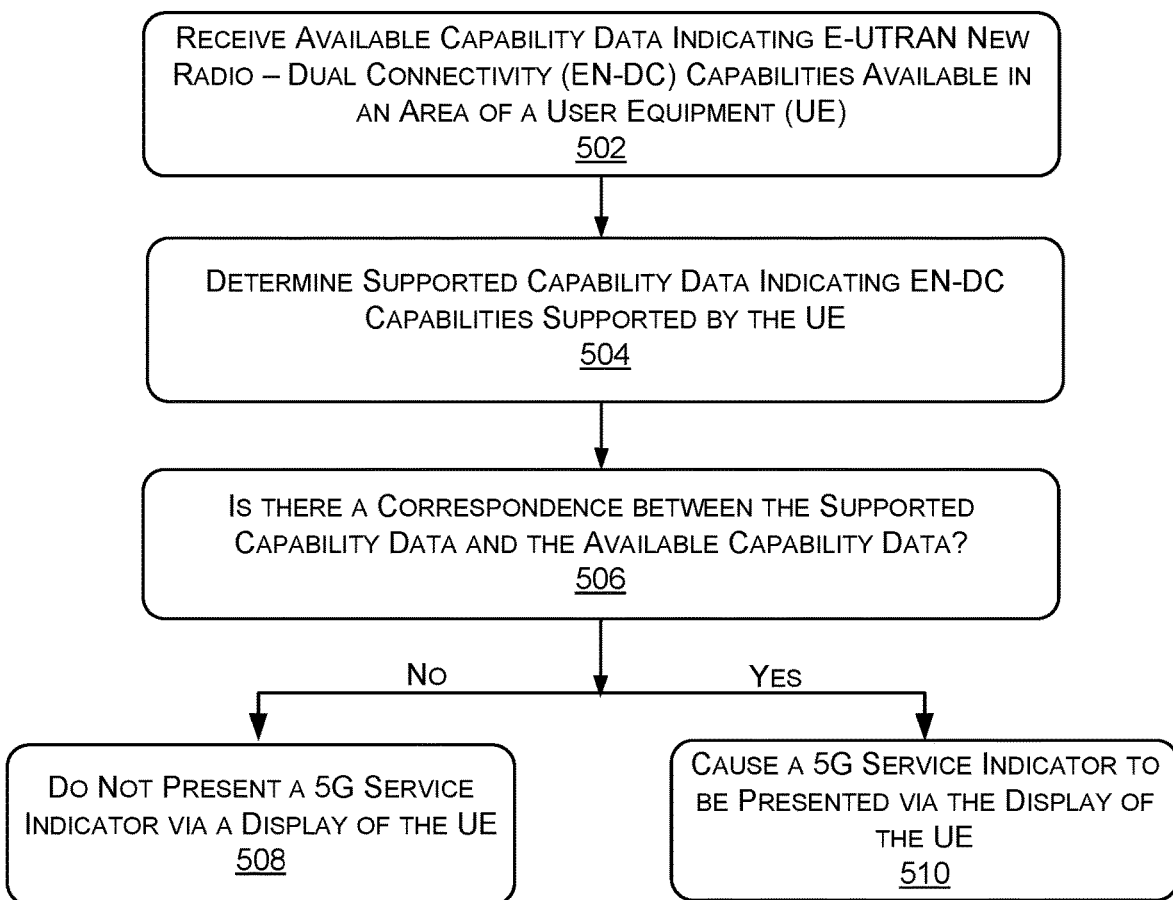
FIG. 5 illustrates an example process for determining, by a UE, whether to cause a 5G service indicator to be presented via the UE, as described herein.

FIG. 5 illustrates an example process for determining, by a UE 102, whether to cause a 5G service indicator to be presented via the UE 102, as described herein.

At operation 502, the client-side capability determination module 116 can receive available capability data indicating EN-DC capabilities available in an area of a UE 102. In at least one example, the client-side capability determination module 116 can receive, from a computing device associated with a 5G network 124, available capability data indicating 5G capabilities available to the UE in a certain area with which the UE is associated (e.g., an area within which the UE is operating). In some examples, the certain area can be a geographic area, which can be associated with one or more cells (e.g., a primary cell, a secondary cell, etc.). In at least one example, the available capability data can indicate one or more NR frequency bands associated with the certain area within which the UE 102 is operating.

The client-side capability determination module 116 can utilize additional or alternative data to determine available capability data. In some examples, the client-side capability determination module 116 can receive an indication of one or more LTE frequency bands associated with the certain area within which the UE 102 is operating. In such examples, the client-side capability determination module 116 can determine the available capability data based at least in part on the LTE frequency bands associated with the certain area. In some examples, the client-side capability determination module 116 can determine a carrier frequency transmitted by a service cell associated with the certain area and/or a LTE neighbor list associated with the certain area. That is, in at least one example neighbor information can be shared through a broadcast message (e.g., LTE SIB). From the broadcast message, the UE 102 can determine what neighbor frequencies are associated with the current service cell. In at least one example, the client-side capability determination module 116 can infer the one or more EN-DC combinations of frequency bands available to the UE 102 based at least in part on the carrier frequency and/or the LTE neighbor list (e.g., based at least in part on LTE frequency bands used in the certain area, which can be determined based at least in part on the carrier frequency transmitted by the service cell and/or from the LTE neighbor list). As such, the UE 102 can infer which EN-DC combination(s) of frequency bands are served by the anchor cell. In at least one example, the client-side capability determination module 116 can determine the one or more EN-DC combinations of frequency bands available to the UE 102 based at least in part on the inferred EN-DC combination(s) of frequency bands. Furthermore, in some examples, the client-side capability determination module 116 can track EN-DC combination(s) of frequency bands that are used in the certain area and store indications of such EN-DC combination(s) of frequency bands (e.g., in a database). In at least one example, the client-side capability determination module 116 can determine the one or more EN-DC combinations of frequency bands available to the UE 102 based at least in part on the indications of used EN-DC combination(s) of frequency bands, for example, using a machine-learning mechanism.

At operation 504, the client-side capability determination module 116 can determine supported capability data indicating EN-DC capabilities supported by the UE 102. In at least one example, the client-side capability determination module 116 can determine supported capability data indicating 5G capabilities supported by the UE 102. In at least one example, supported capability data can be stored in the database 120. In at least one example, a determination of supported capability data can be based at least in part on determining that the UE 102 is associated with a subscription enabling the UE 102 to access certain capabilities.

At operation 506, the client-side capability determination module 116 can determine whether there is a correspondence between the supported capability data and the available capability data. In at least one example, the client-side capability determination module 116 can compare the available capability data with the supported capability data to determine whether there is a correspondence between the available capability data and the supported capability data. In at least one example, such a correspondence can be a match between capabilities supported by the UE 102 and available to the UE 102. In some examples, such a correspondence can be a similarity metric that satisfies a threshold, or the like.

At operation 508, based at least in part on determining that there is not a correspondence between the supported capability data and the available capability data (i.e., "no" at operation 506), the client-side capability determination module 116 can refrain from causing the 5G service indicator to be presented via a display of the UE 102.

At operation 510, based at least in part on determining that there is a correspondence between the supported capability data and the available capability data (i.e., "yes" at operation 506), the client-side capability determination module 116 can cause the 5G service indicator to be presented via the display of the UE 102. In at least one example, if there is a match, or other correspondence, between the supported capability data and the available capability data, the client-side capability determination module 116 can cause a 5G service indicator to be presented via a display of the UE 102. Non-limiting examples of 5G service indicators are described above with reference to FIGS. 2A-2C.

Figure 6:
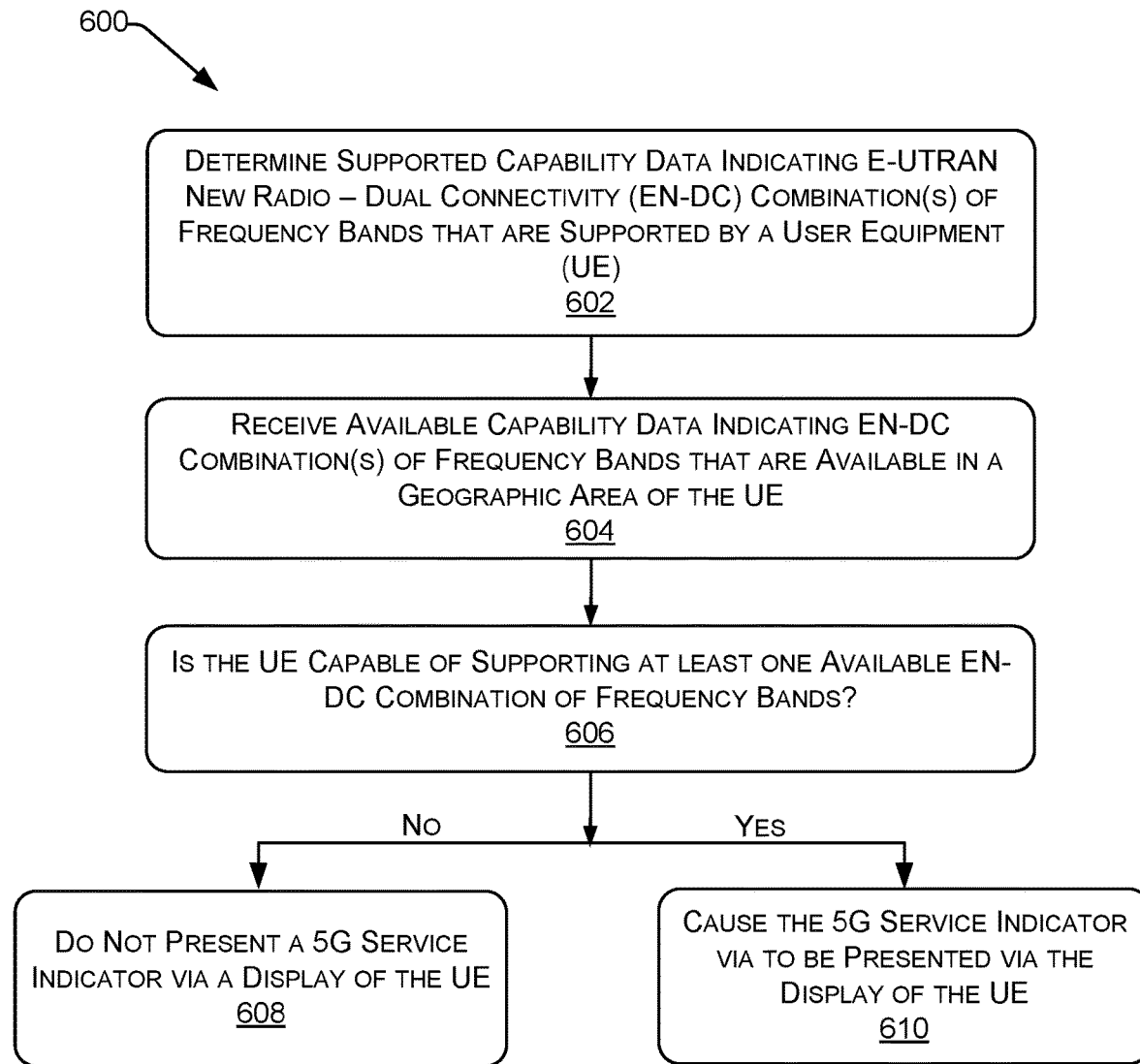
FIG. 6 illustrates an example process for determining, by a UE, and based at least in part on EN-DC combination(s) of frequency bands, whether to cause a 5G service indicator to be presented via the UE, as described herein.

FIG. 6 illustrates an example process 600 for determining, by a UE 102, and based at least in part on EN-DC combination(s) of frequency bands, whether to cause a 5G service indicator to be presented via the UE 102, as described herein.

At operation 602, the client-side capability determination module 116 can receive available capability data indicating EN-DC combination(s) of frequency bands that are available in an area of a UE 102. As described above, in at least one example, the client-side capability determination module 116 can receive, from a computing device associated with a 5G network, available capability data indicating 5G capabilities available to the UE in a certain area with which the UE is associated (e.g., an area within which the UE is operating). In some examples, the certain area can be a geographic area, which can be associated with one or more cells (e.g., a primary cell, a secondary cell, etc.). In at least one example, the available capability data can indicate one or more NR frequency bands associated with the certain area within which the UE 102 is operating. In at least one example, the client-side capability determination module 116 can determine, based at least in part on the indication of the one or more NR frequency bands associated with the certain area, one or more available EN-DC combinations of frequency bands available to the UE 102 in the certain area.

The client-side capability determination module 116 can utilize additional or alternative data to determine which EN-DC combination(s) of frequency bands are available to the UE 102. In some examples, the client-side capability determination module 116 can receive an indication of one or more LTE frequency bands associated with the certain area within which the UE 102 is operating. In such examples, the client-side capability determination module 116 can determine the one or more EN-DC combinations of frequency bands available to the UE 102 based at least in part on the LTE frequency bands associated with the certain area. In some examples, the client-side capability determination module 116 can determine a carrier frequency transmitted by a service cell associated with the certain area and/or a LTE neighbor list associated with the certain area. In at least one example, the client-side capability determination module 116 can infer the one or more EN-DC combinations of frequency bands available to the UE 102 based at least in part on the carrier frequency and/or the LTE neighbor list (e.g., based at least in part on LTE frequency bands used in the certain area, which can be determined based at least in part on the carrier frequency transmitted by the service cell and/or from the LTE neighbor list). In such an example, the client-side capability determination module 116 can determine the one or more EN-DC combinations of frequency bands available to the UE 102 based at least in part on the inferred EN-DC combination(s) of frequency bands. Furthermore, in some examples, the client-side capability determination module 116 can track EN-DC combination(s) of frequency bands that are used in the certain area and store indications of such EN-DC combination(s) of frequency bands (e.g., in a database). In at least one example, the client-side capability determination module 116 can determine the one or more EN-DC combinations of frequency bands available to the UE 102 based at least in part on the indications of used EN-DC combination(s) of frequency bands, for example, using a machine-learning mechanism.

At operation 604, the client-side capability determination module 116 can determine supported capability data indicating EN-DC combination(s) of frequency bands that are supported by the UE 102. As described above, in at least one example, the client-side capability determination module 116 can determine supported capability data indicating 5G capabilities supported by the UE 102. In at least one example, such data can include EN-DC combination(s) of frequency bands that are supported by the UE 102. In at least one example, the UE 102 can "support" an EN-DC combination of frequency bands based at least in part on a determination that the UE 102 is capable of accessing the EN-DC combination of frequency bands available to the UE 102. In at least one example, a determination of whether the UE 102 can support an EN-DC combination of frequency bands can be based at least in part on determining that the UE 102 is associated with a subscription enabling the UE 102 to access the EN-DC combination of frequency band. In at least one example, supported capability data, subscription data, etc. can be stored in a database 120 associated with the UE 102.

At operation 606, the client-side capability determination module 116 can determine whether the UE 102 is capable of supporting at least one available EN-DC combination of frequency bands. In at least one example, the client-side capability determination module 116 can compare the available capability data with the supported capability data to determine whether there is a correspondence between the available capability data and the supported capability data. In at least one example, the client-side capability determination module 116 can compare the one or more available EN-DC combinations of frequency bands with the one or more supported EN-DC combinations of frequency bands to determine if there is a match, or other correspondence, between at least one of the one or more available EN-DC combinations of frequency bands and at least one of the one or more supported EN-DC combinations of frequency bands.

At operation 608, if the UE 102 is not capable of supporting at least one available EN-DC combination of frequency bands (i.e., "no" at operation 606), the client-side capability determination module 116 can refrain from causing the 5G service indicator to be presented via a display of the UE 102, as described above with reference to operation 508 of FIG. 5.

At operation 610, if the UE 102 is capable of supporting at least one available EN-DC combination of frequency bands (i.e., "yes" at operation 606), the client-side capability determination module 116 can cause the 5G service indicator to be presented via the display of the UE 102, as described above with reference to operation 510 of FIG. 5. That is, if there is a match, or other correspondence, between at least one of the one or more available EN-DC combinations of frequency bands and at least one of the one or more supported EN-DC combinations of frequency bands, the client-side capability determination module 116 can cause a 5G service indicator to be presented via a display of the UE 102. The 5G service indicator can indicate that 5G radio access technology—availed via a 5G network—is available to the UE 102.

Figure 7:
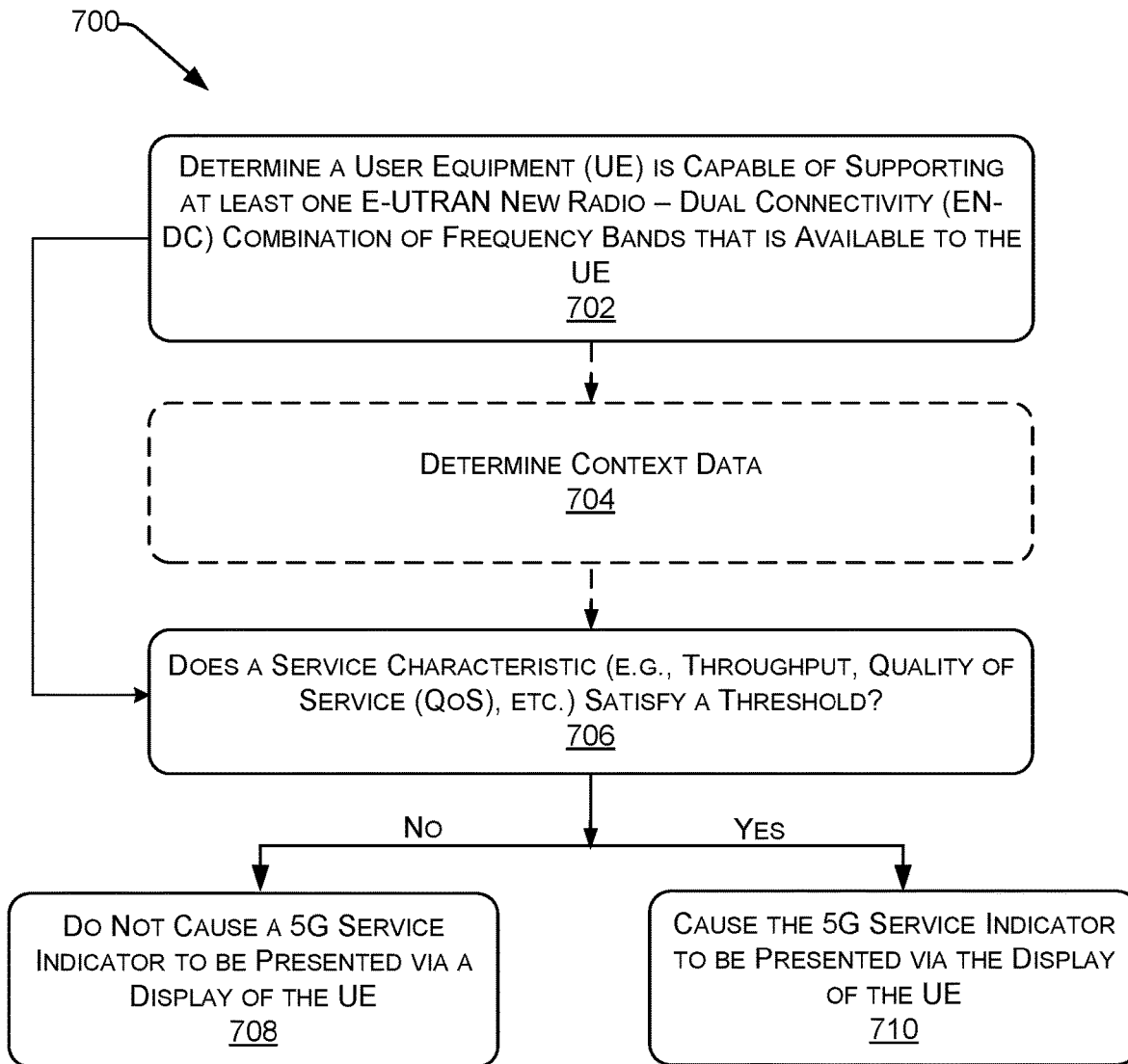
FIG. 7 illustrates an example process for determining whether to cause a 5G service indicator to be presented via a UE based at least in part on a service characteristic, as described herein.

FIG. 7 illustrates an example process 700 for determining whether to cause a 5G service indicator to be presented via a UE 102 based at least in part on a service characteristic, as described herein.

At operation 702, the client-side capability determination module 116 and/or the server-side capability determination module 134 can determine a UE 102 is capable of supporting at least one EN-DC combination of frequency bands that is available to the UE 102, as described above with reference to operations 406 and 606 of FIGS. 4 and 6, respectively.

At operation 704, which can be optional, the client-side capability determination module 116 and/or the server-side capability determination module 134 can determine context data. In some examples, context data can be provided with the capability data (i.e., from the UE 102 to the server(s) 104). In some examples, context data can be received by the client-side capability determination module 116 from other components of the UE 102. Context data can include, but is not limited to, geolocation data (e.g., a location of the UE), application data (e.g., indicating which application(s) are executing on the UE 102 and/or for which the 5G services may be used), and/or the like.

At operation 706, the client-side capability determination module 116 and/or the server-side capability determination module 134 can determine whether a service characteristic satisfies a threshold. In at least one example, the client-side capability determination module 116 and/or the server-side capability determination module 134 can determine context data can determine service characteristic(s) associated with the at least one EN-DC combination of frequency bands that is available to the UE 102. For example, such a service characteristic can be throughput, QoS, or the like. In at least one example, certain service characteristics can be required to satisfy a threshold before a 5G service indicator can be presented. In such an example, the client-side capability determination module 116 and/or the server-side capability determination module 134 can compare a service characteristic associated with the at least one EN-DC combination of frequency bands that is available to the UE 102 to determine whether the service characteristic satisfies (e.g., meets or exceeds) a relevant threshold. In some examples, the threshold can be determined based at least in part on the context data.

At operation 708, based at least in part on determining that the service characteristic does not satisfy the threshold (i.e., "no" at operation 706), the client-side capability determination module 116 and/or the server-side capability determination module 134 can determine not to cause a 5G service indicator to be presented via a display of the UE 102, as described above with reference to operations 308 and/or 508 of FIGS. 3 and 5, respectively.

At operation 710, based at least in part on determining that the service characteristic satisfies the threshold (i.e., "yes" at operation 706), the client-side capability determination module 116 and/or the server-side capability determination module 134 can cause the 5G service indicator to be presented via the display of the UE 102, as described above with reference to operations 310 and/or 510 of FIGS. 3 and 5, respectively.

While FIG. 7 is directed to comparing a service characteristic to a threshold to determine whether to present a 5G service indicator, as described above, in some examples, a confidence score associated with the at least one EN-DC combination can be compared to a threshold to determine whether to present a 5G service indicator. In such an example, if the confidence score satisfies the threshold (i.e., meets or exceeds the threshold), a 5G service indicator can be presented via the display of the UE 102. However, if the confidence score does not satisfy the threshold (i.e., is below the threshold), a 5G service indicator may not be presented.

Figure 8:
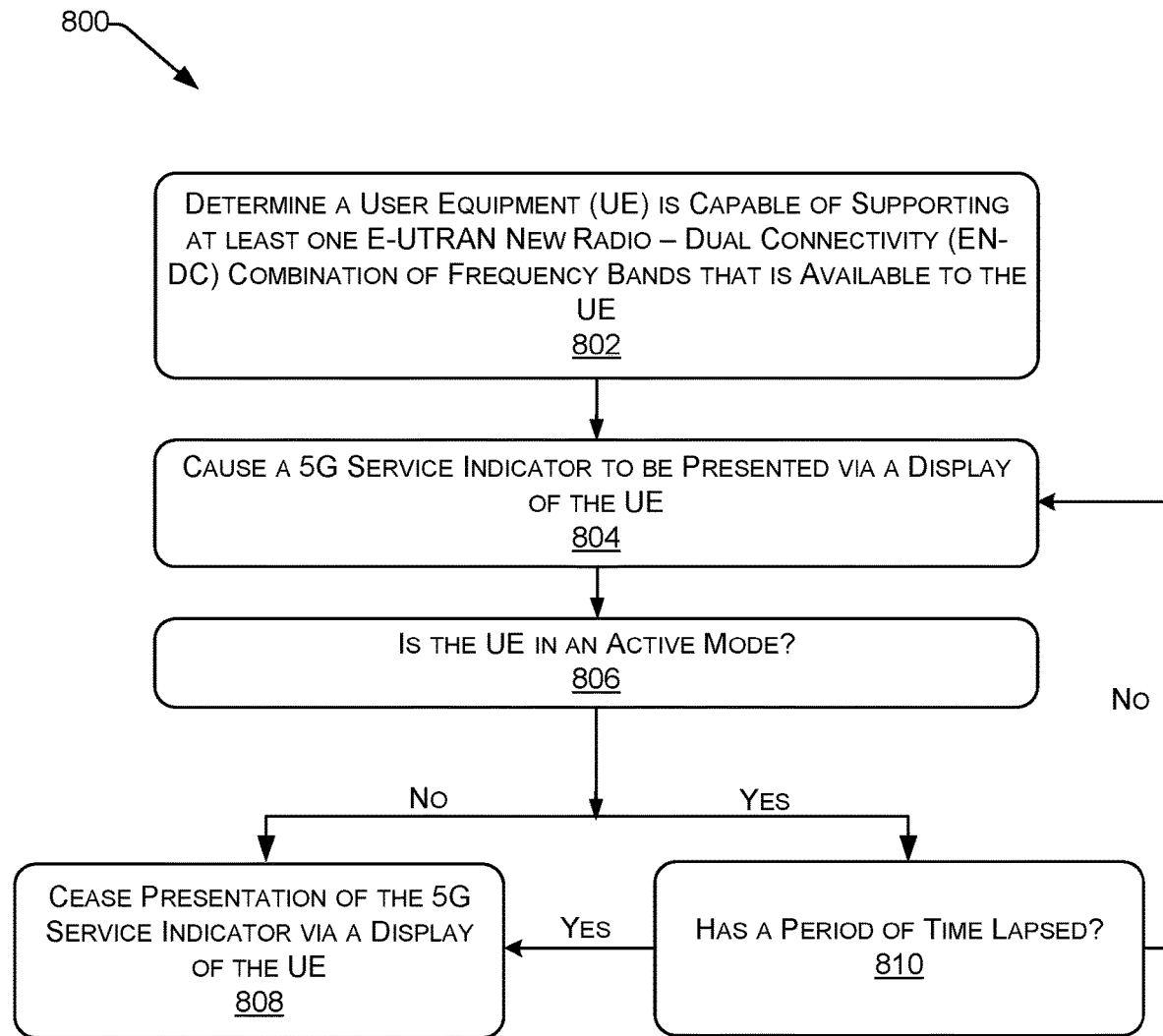
FIG. 8 illustrates an example process for determining when to cease presentation of a 5G service indicator via a display of a UE, as described herein.

In an additional or alternative example, the 5G service indicator can be presented for a period of time, so long as the UE 102 is associated with a state indicating that the UE 102 is in an active mode. FIG. 8 illustrates an example process 800 for determining when to cease presentation of a 5G service indicator via a display of a UE 102, as described herein.

At operation 802, the client-side capability determination module 116 and/or the server-side capability determination module 134 can determine a UE 102 is capable of supporting at least one EN-DC combination of frequency bands that is available to the UE 102, as described above with reference to operations 406 and 606 of FIGS. 4 and 6, respectively.

At operation 804, the client-side capability determination module 116 and/or the server-side capability determination module 134 can cause a 5G service indicator to be presented via a display of the UE 102, as described above with reference to operations 308 and/or 508 of FIGS. 3 and 5, respectively.

At operation 806, the client-side capability determination module 116 can determine whether the UE 102 is in an active mode. In at least one example, the client-side capability determination module 116 can access state data associated with the UE 102 to determine whether UE 102 is associated with an active mode or inactive mode.

At operation 808, the client-side capability determination module 116 can cause presentation of the 5G service indicator via a display of the UE 102 to cease. That is, if the UE is no longer in an active mode (i.e., "no" at operation 806), the client-side capability determination module 116 can cause presentation of the 5G service indicator to cease.

At operation 810, the client-side capability determination module 116 can determine whether a period of time has lapsed. As described above, in some examples, the 5G service indicator can be presented for a period of time, which can be configurable. If the period of time has not lapsed (i.e., "no" at operation 810), the process 800 can return to operation 804. If the period of time has lapsed (i.e., "yes" at operation 810), the client-side capability determination module 116 can cause presentation of the 5G service indicator via a display of the UE 102 to cease, as illustrated at operation 808.

Figure 9:
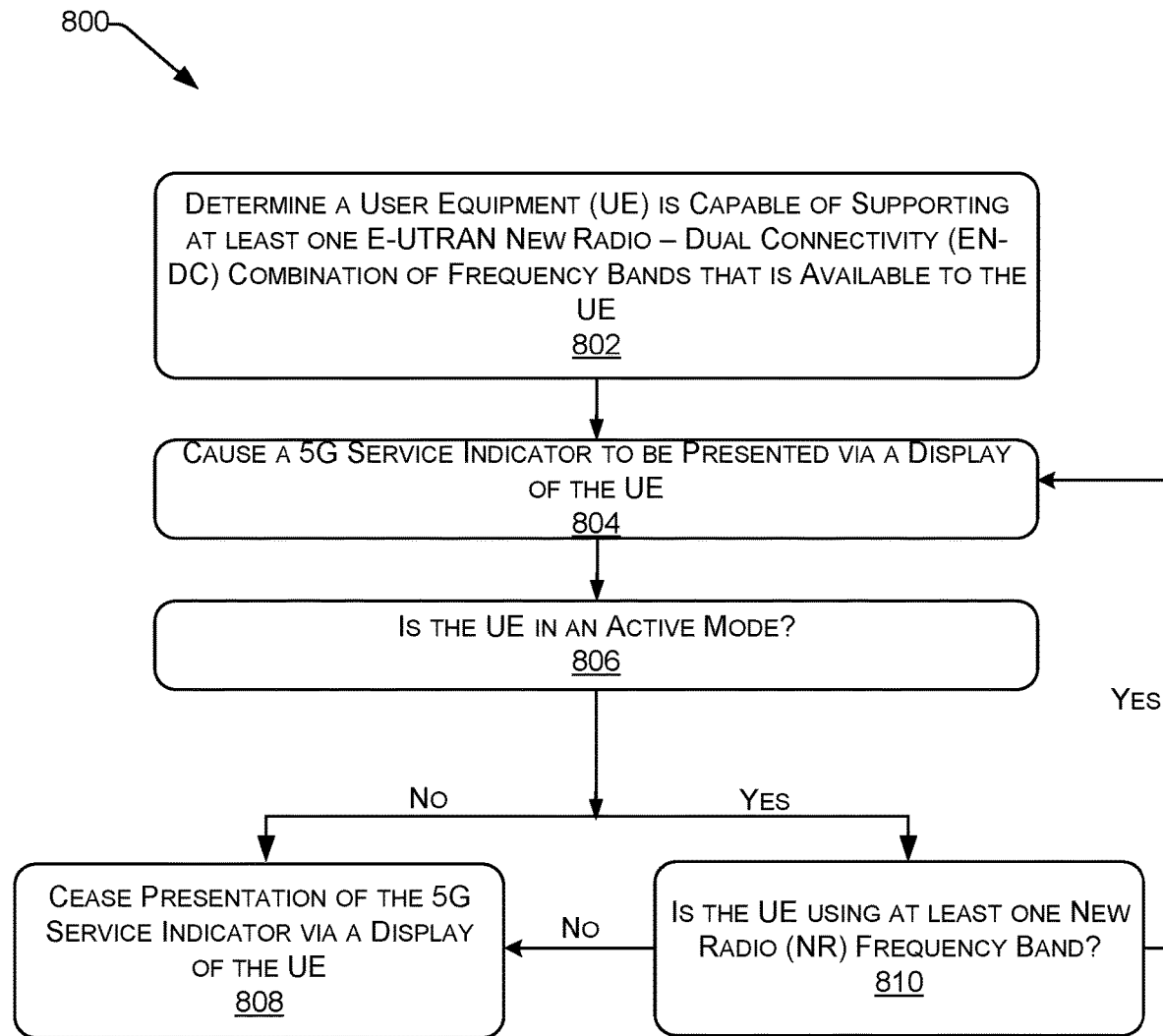
FIG. 9 illustrates an example process for determining when to cease presentation of a 5G service indicator via a display of a UE, as described herein.

As described above, in at least one example, the 5G service indicator can be presented so long as the UE 102 is associated with a state indicating that the UE 102 is in an active mode and the UE 102 continues to use one or more NR frequency bands. FIG. 9 illustrates an example process for determining when to cease presentation of a 5G service indicator via a display of a UE, as described herein.

At operation 902, the client-side capability determination module 116 and/or the server-side capability determination module 134 can determine a UE 102 is capable of supporting at least one EN-DC combination of frequency bands that is available to the UE 102, as described above with reference to operations 406 and 606 of FIGS. 4 and 6, respectively.

At operation 904, the client-side capability determination module 116 and/or the server-side capability determination module 134 can cause a 5G service indicator to be presented via a display of the UE 102, as described above with reference to operations 308 and 310 of FIG. 3.

At operation 906, the client-side capability determination module 116 can determine whether the UE 102 is in an active mode, as described above with reference to operation 806 of FIG. 8.

At operation 908, the client-side capability determination module 116 can cause presentation of the 5G service indicator via a display of the UE 102 to cease, as described above with reference to operation 808 of FIG. 8. That is, if the UE is no longer in an active mode (i.e., "no" at operation 906), the client-side capability determination module 116 can cause presentation of the 5G service indicator to cease.

At operation 910, the client-side capability determination module 116 can determine whether the UE 102 is using at least one NR frequency band. If the UE 102 is using at least one NR frequency band (i.e., "yes" at operation 910), the process 900 can return to operation 904. If the UE 102 is no longer using at least one NR frequency band (i.e., "no" at operation 910), the client-side capability determination module 116 can cause presentation of the 5G service indicator via a display of the UE 102 to cease, as illustrated at operation 908.

Although the subject matter has been described in language specific to structural data items and/or methodological acts, it is to be understood that the subject matter defined in the appended claims is not necessarily limited to the specific data items or acts described. Rather, the specific data items and acts are disclosed as example forms of implementing the claims.

What is claimed is:

1. A computer-implemented method comprising:
   establishing, by a user equipment (UE), a connection to a network node configured with Non-Standalone (NSA) Network Architecture;
   receiving, from a computing device associated with a Fifth Generation (5G) network and by the UE, available capability data indicating 5G capabilities available to the UE in a geographic area with which the UE is associated;
   accessing subscription data associated with the UE;
   determining, by the UE, supported capability data indicating 5G capabilities supported by the UE based at least in part on determining that the UE is associated with a subscription enabling the UE to access one or more supported E-UTRAN New Radio-Dual Connectivity (EN-DC) combinations of frequency bands available to the UE in the geographic area, wherein the one or more supported EN-DC combinations of frequency bands are stored in a database of the UE;
   determining, based at least in part on one or more available EN-DC combinations of frequency bands associated with the available capability data and the supported capability data, a correspondence between the available capability data and the supported capability data by:
      comparing, by the UE, the one or more available EN-DC combinations of frequency bands with the one or more supported EN-DC combinations of frequency bands that are stored in the database of the UE; and
      determining, by the UE and based at least in part on the comparing, that at least one available EN-DC combination of frequency bands is also a supported EN-DC combination of frequency bands; and
   determining to present a service indicator indicating that 5G wireless communication technology is available based at least in part on determining the correspondence.

2. The computer-implemented method of claim 1, wherein the available capability data indicates one or more New Radio (NR) frequency bands associated with a geographic area within which the UE is operating, the operations further comprising determining, based at least in part on the one or more NR frequency bands associated with the geographic area, one or more available EN-DC combinations of frequency bands available to the UE in the geographic area.

3. The computer-implemented method of claim 1, wherein determining the supported capability data comprises performing a look-up of a database associated with the UE to determine the supported capability data.

4. The computer-implemented method of claim 1, wherein a state of the UE is associated with an active mode, and wherein the service indicator is presented for a predetermined period of time while the UE is in the active mode.

5. The computer-implemented method of claim 1, wherein a state of the UE is associated with an active mode, and wherein the service indicator is presented while the UE is in the active mode and until the UE ceases to use one or more New Radio (NR) frequency bands.

6. The computer-implemented method of claim 1, wherein the subscription data is stored in a database of the UE.

7. The computer-implemented method of claim 1, wherein the one or more supported EN-DC combinations of frequency bands that are stored in the database of the UE include at least a first EN-DC combination of frequency bands and a second EN-DC combination of frequency bands that is different than the first EN-DC combination of frequency bands.

8. The computer-implemented method of claim 1, wherein the service indicator indicates a first level of 5G wireless service or a second level of 5G wireless service, the second level of 5G wireless service being a higher quality of service than the first level of 5G wireless service.

9. The computer-implemented method of claim 1, wherein the service indicator indicates a type of service capable on the UE via the 5G wireless communication technology.

10. The computer-implemented method of claim 9, wherein the type of service is based at least in part on context data including at least one of geolocation data or application data.

11. One or more non-transitory computer-readable media comprising instructions that, when executed by one or more processors, cause the one or more processors to perform operations comprising:
   establishing, by a user equipment (UE), a connection to a network node configured with Non-Standalone (NSA) Network Architecture;
   receiving, from a computing device associated with a Fifth Generation (5G) network and by the UE, an indication of one or more New Radio (NR) frequency bands associated with a geographic area within which the UE is operating;
   accessing subscription data associated with the UE, wherein the subscription data is stored in a database of the UE;
   determining, based at least in part on the indication of the one or more NR frequency bands associated with the geographic area and by the UE, one or more E-UTRAN New Radio-Dual Connectivity (EN-DC) combinations of frequency bands available to the UE in the geographic area;
   determining, by the UE and based at least in part on one or more UE capabilities, that the UE is capable of accessing at least one of the one or more EN-DC combinations of frequency bands available to the UE in the geographic area, the one or more UE capabilities identifying the one or more EN-DC combinations of frequency bands as being supported by the UE, wherein determining that the UE is capable of accessing the at least one of the one or more of the EN-DC combinations of frequency bands available to the UE in the geographic area is based at least in part on determining that the UE is associated with a subscription enabling the UE to access the one or more of the EN-DC combinations of frequency bands available to the UE in the geographic area; and
   presenting, by the UE and based at least in part on determining that the UE is capable of accessing the at least one of the one or more EN-DC combinations of frequency bands available to the UE in the geographic area, a service indicator indicating that 5G wireless communication technology is available, wherein a state of the UE is associated with an active mode, and wherein the service indicator is presented for a predetermined period of time while the UE is in the active mode.

12. The one or more non-transitory computer-readable media of claim 11, wherein a state of the UE is associated with an active mode and the UE is using one or more NR frequency bands.

13. The one or more non-transitory computer-readable media of claim 11, wherein the indication is a first indication, the operations further comprising receiving a second indication of one or more Long Term Evolution (LTE) frequency bands associated with the geographic area, wherein the one or more EN-DC combinations of frequency bands available to the UE in the geographic area are further determined based at least in part on the one or more LTE frequency bands associated with the geographic area.

14. The one or more non-transitory computer-readable media of claim 11, wherein determining that the UE is capable of accessing one or more of the EN-DC combinations of frequency bands available to the UE in the geographic area is based at least in part on determining that the UE supports one or more of the EN-DC combinations of frequency bands available to the UE in the geographic area.

15. The one or more non-transitory computer-readable media of claim 11, wherein a state of the UE is associated with an active mode, and wherein the service indicator is presented while the UE is in the active mode and until the UE ceases to use the one or more NR frequency bands.

16. A user equipment (UE) comprising:
   one or more processors; and
   one or more non-transitory computer-readable media comprising instructions that, when executed by the one or more processors, cause the UE to perform operations comprising:
      establishing a connection to a network node configured with Non-Standalone (NSA) Network Architecture;
      receiving an indication of one or more New Radio (NR) frequency bands associated with a geographic area within which the UE is operating;
      accessing subscription data associated with the UE, wherein the subscription data is stored in a database of the UE;
      determining, based at least in part on the indication of the one or more NR frequency bands associated with the geographic area, one or more E-UTRAN New Radio-Dual Connectivity (EN-DC) combinations of frequency bands available to the UE in the geographic area;

determining, at a first time and based at least in part on one or more UE capabilities, that the UE is capable of accessing at least one of the one or more EN-DC combinations of frequency bands available to the UE in the geographic area, wherein determining that the UE is capable of accessing at least one of the one or more of the EN-DC combinations of frequency bands available to the UE in the geographic area is based at least in part on determining that the UE is associated with a subscription enabling the UE to access the one or more of the EN-DC combinations of frequency bands available to the UE in the geographic area;

presenting, based at least in part on determining that the UE is capable of accessing the at least one of the one or more EN-DC combinations of frequency bands available to the UE in the geographic area, a service indicator indicating that Fifth Generation (5G) wireless communication technology is available via a display of the UE;

determining, at a second time after the first time and based at least in part on the one or more UE capabilities, that the UE is not capable of supporting any of the one or more available EN-DC combinations of frequency bands; and terminating presentation of the service indicator on the display of the UE.

17. The UE of claim 16, wherein the indication of the one or more NR frequency bands is received from one or more computing devices associated with a 5G network.

18. The UE of claim 16, wherein determining the one or more EN-DC combinations of frequency bands available to the UE in the geographic area is further based at least in part on:

determining a carrier frequency transmitted by a serving cell associated with the geographic area;

determining a Long-Term Evolution (LTE) neighbor list; and inferring the one or more EN-DC combinations of frequency bands available to the UE in the geographic area based at least in part on the carrier frequency and the LTE neighbor list.

19. The UE of claim 16, wherein determining the one or more EN-DC combinations of frequency bands available to the UE in the geographic area is further based at least in part on:

tracking used EN-DC combinations of frequency bands used in the geographic area; and storing the used EN-DC combinations of frequency bands, wherein determining the one or more EN-DC combinations of frequency bands available to the UE in the geographic area is further based at least in part on the used EN-DC combinations of frequency bands and a machine-learning mechanism.

20. The UE of claim 16, the operations further comprising determining the one or more EN-DC combinations of frequency bands available to the UE in the geographic area further based at least in part on one or more Long-Term Evolution (LTE) bands associated with the geographic area.

* * * * *